(12) United States Patent
Ujigawa

(10) Patent No.: US 7,894,086 B2
(45) Date of Patent: Feb. 22, 2011

(54) IMAGE FORMING SYSTEM AND COMMUNICATION CONTROL METHOD IN THE IMAGE FORMING SYSTEM

(75) Inventor: Yasushi Ujigawa, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1605 days.

(21) Appl. No.: 11/193,438

(22) Filed: Aug. 1, 2005

(65) Prior Publication Data

US 2006/0215218 A1   Sep. 28, 2006

(30) Foreign Application Priority Data

Mar. 22, 2005   (JP) .............................. 2005-081693

(51) Int. Cl.
  *G06K 15/00* (2006.01)
(52) U.S. Cl. ........................ 358/1.14; 399/21
(58) Field of Classification Search ................ 358/1.14, 358/1.15, 498
  See application file for complete search history.

(56) References Cited

U.S. PATENT DOCUMENTS 5,956,160 A * 9/1999 Watanabe .................... 358/496
7,173,724 B2 * 2/2007 Nomura et al. ............. 358/1.15

FOREIGN PATENT DOCUMENTS

| JP | 10-177320 | 6/1998 |
|----|-----------|--------|
| JP | 2000-115437 | 4/2000 |
| JP | 2000-270167 A | 9/2000 |
| JP | 2001-257820 A | 9/2001 |
| JP | 2002-176523 | 6/2002 |
| JP | 2002-185679 | 6/2002 |
| JP | 2004-056445 | 2/2004 |

OTHER PUBLICATIONS

Jan. 12, 2010 Japanese Office Action issued in JP Application No. 2005-081693 (with English translation).

* cited by examiner

*Primary Examiner*—Mark K Zimmerman
*Assistant Examiner*—Lennin Rodriguez
(74) *Attorney, Agent, or Firm*—Oliff & Berridge, PLC

(57) ABSTRACT

An image forming system includes an image reading apparatus, a printer that is connected to the image reading apparatus and performs printing processing by directly receiving image data read by the image reading apparatus, and a notification unit that notifies failure information to the other apparatus if a failure occurs either in the image reading apparatus or in the printer, wherein the image reading apparatus includes a failure information acquisition unit that acquires failure information notified by the notification unit when a failure has occurred in the printer, a determination unit that determines whether or not the image reading apparatus is in the process of reading image data.

5 Claims, 8 Drawing Sheets

| CONNECTION STATE /501 | FAILURE OCCURRENCE LOCATION /502 | SCANNER PROCESSING STATE /503 | PANEL OPERATION STATE /504 | | ALARM SOUNDING STATE /505 | |
|---|---|---|---|---|---|---|
| | | | PRINTER | SCANNER | PRINTER | SCANNER |
| LOCAL CONNECTION | PRINTER | SCANNING | VALID | INVALID | ON | OFF |
| | | AFTER SCANNING | VALID | VALID | ON | OFF |
| | SCANNER | — | INVALID | VALID | OFF | ON |
| NETWORK CONNECTION | PRINTER | SCANNING | VALID | INVALID | ON | ON(LOW) |
| | | AFTER SCANNING | VALID | VALID | ON | OFF |
| | SCANNER | — | INVALID | VALID | ON(LOW) | ON |

FIG.5

IMAGE FORMING SYSTEM AND COMMUNICATION CONTROL METHOD IN THE IMAGE FORMING SYSTEM

BACKGROUND OF THE INVENTION

1. Field of the Invention

The present invention relates to an image forming system and a communication control method in the image forming system designed to print out an image captured by a scanner with the use of a printer, and in particular to an image forming system and communication control method which enable recovery from a failure by interlinking the scanner with the printer.

2. Description of the Related Art

Generally, copying a printing document is performed by reading and printing out the printing document with the use of a copying machine or the like. The copying processing for copying a printing document can be implemented, in addition to using a copying machine, by using a scanner and a printer together. According to the copying method using a scanner and a printer together, a printing document is read by a scanner and the image data thus captured is printed out by a printer connected to the scanner.

In an environment where a scanner is connected to plural printers via a network, this method is also usable as substitute for a facsimile when information is transmitted to a recipient by causing one of the printers that is remotely located from the scanner to print out the information. If a failure occurs during copying processing being performed in such environment where a scanner is connected to plural printers via a network, a failure message is displayed on display screens of both the scanner and the printers. This is because the printing processing is realized by the cooperative interlinkage between the scanner and the printers.

However, an alarm screen displayed on both the scanner and the printers to indicate the failure may cause confusion to a user, which would not only adversely affect recovery from the failure, but also cause erroneous operation leading to a second failure.

There has been proposed a technique that is disclosed in Japanese Patent Application Publication No. 2001-257820, which is so arranged that, when a printer and a scanner are used together as a single multi-function printer, only one of the operation panels is enabled to set the functions of operation panels in both the printer and the scanner, while inputting operations through the other operation panel are prohibited or disabled.

According to the conventional technique disclosed in the Japanese Patent Application Publication No. 2001-257820, the scanner and the printer are detachably connected by a connecting member. This technique is able to enhance the operability of the operation panels if designated scanner and printer are connected.

There has also been proposed a technique that is disclosed in Japanese Patent Application Publication No. 2000-270167, which is so arranged that a printer is controlled by a controller on the scanner side only when a copy instruction is given by the operation panel of the scanner so as to operate the printer and the scanner synchronously to perform copying.

The conventional technique disclosed in the Japanese Patent Application Publication No. 2000-270167 makes it possible to perform copying with a simple operation of the scanner.

Further, according to the conventional technique disclosed in the Japanese Patent Application Publication No. 2000-270167, if an error occurs on the printer side while the scanner and the printer are being used as the copy mode, a message is displayed on the scanner's operation panel, indicating a brief outline of the error and an instruction to look at the printer's operation panel, while displaying details of the error on the printer's operation panel. This makes it possible to easily handle the error.

However, the description of the conventional technique in the Japanese Patent Application Publication No. 2001-257820 is limited to the operations of the operation panels when designated scanner and printer are connected by P2P (Peer to Peer) connection. This conventional technique poses a problem that the operability of the operation panels cannot be enhanced in a case where communication is to be conducted between an arbitrary combination of a scanner and a printer among plural scanners and printers present in a network.

In other words, the technique disclosed in the Japanese Patent Application Publication No. 2001-257820 cannot enhance the operability of the operation panel if a single printer communicates with plural scanners.

According to the conventional technique disclosed in the Japanese Patent Application Publication No. 2000-270167, in the scanners and the printers that are network-connected or locally connected, when an error occurs, the error will be handled by displaying an appropriate message to one side where the error has occurred and a different appropriate message to the other side that communicates with the one side. However, since it is possible for a third party to perform operations in a network-connected environment, a problem will occur that processing may be performed in a way not intended by the user.

As described in the Japanese Patent Application Publication No. 2000-270167, if a failure occurs during printing processing in an environment where a scanner and a printer are connected (regardless of network-connection or local connection), the failure is handled individually and independently even though the scanner and the printer are interlinked with each other to cooperatively perform copying processing. This will pose a problem that an operation not intended by the user is done and this leads to a second failure.

For example, if the printer, operation of which is suspended by a failure which has occurred in the scanner during copying processing, is reset or restarted by a third party, the print-out operation cannot be restarted even through the failure in the scanner is removed.

SUMMARY OF THE INVENTION

The present invention has been made in view of the above circumstances and provides an image forming system and a communication control method in the image forming system which are able to recover from a failure by causing system apparatuses to cooperate in linkage with each other when the failure occurs.

According to an aspect of the present invention, an image forming system comprises an image reading apparatus, a printer that is connected to the image reading apparatus and performs printing processing by directly receiving image data read by the image reading apparatus, and a notification unit that notifies failure information to the other apparatus if a failure occurs either in the image reading apparatus or in the printer, wherein the image reading apparatus comprises a failure information acquisition unit that acquires failure information notified by the notification unit when a failure has occurred in the printer, a determination unit that determines whether or not the image reading apparatus is in the process of reading image data, and an announcing unit that announces the failure information acquired by the failure information acquisition unit, if the determination unit determines that the image reading apparatus is not in the process of reading image data, wherein the printer comprises an announcement prohibiting unit that prohibits announcement of the failure information notified by the notification unit, if the failure has occurred in the image reading apparatus.

With the above configuration, both the apparatuses are controlled in accordance with processing state of the apparatus having the failure when the failure has occurred. Thus, the apparatuses communicating with each other are enabled to be restored from the failure in linkage with each other.

Additionally, the present invention makes it possible to eliminate the chance that any unintended operation is made by a third party during failure recovery processing. Therefore, it is possible to prevent the apparatuses from being erroneously activated or operated, and hence the operability for users can be enhanced.

BRIEF DESCRIPTION OF THE DRAWINGS

Embodiment of the present invention will be described in detail based on the following figures, wherein:

FIG. 5 is a matrix diagram illustrating particulars of operations of the scanner and the printer when a failure has occurred;

DESCRIPTION OF THE PREFERRED EMBODIMENTS

Embodiment of an image forming system and a communication control method according to the present invention will now be described with reference to the attached drawings.

Figure 1:
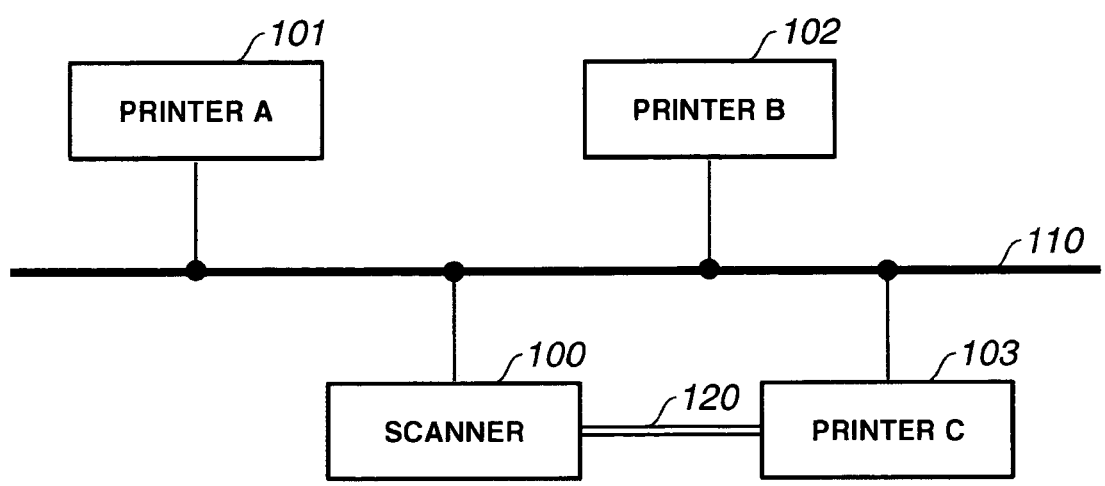
FIG. 1 is a block diagram illustrating a system configuration to which an image forming system and communication control method according to the present invention are applied.

FIG. 1 is a block diagram illustrating a system configured by applying the image forming system and the communication control method according to the present invention.

Referring to FIG. 1, the image forming system includes a scanner 100, a printer A101, a printer B102, and a printer C103, which are network connected as nodes on a network by means of an Ethernet (registered trademark) cable 110 or the like. The scanner 100 and the printer C103 are also locally connected by means of a USB (Universal Serial Bus) cable 120 in addition to the network connection by the network cable 110.

Copying processing can be performed by printing out image data read by the scanner 100 with the use of a printer selected by a user (one of the printers A101, B102 and C103).

The scanner 100 reads a printing document and communicates with the other nodes on the network to perform processing according to the contents of the communication. Specifically, upon receiving information on a failure occurring in one of the printers, the scanner 100 performs processing based on the received failure information. The scanner 100 is also capable of notifying the printers of a failure which has occurred in the scanner 100.

Upon receiving a notification of a failure occurring in a printer, the scanner 100 performs processing according to its processing state.

For example, if the scanner 100 receives a notification of a failure from one of the printers when the scanner 100 is in the process of reading a printing document, the scanner 100 temporarily stops the reading operation and determines whether a print queue can be used to queue a print job. If the failure which has occurred is an output-related failure such as paper out or paper jam and the print queue can be used, the scanner 100 restarts the read processing of the printing document and stores the print job for the read image in the print queue.

If the failure is a communication-related failure such as cable breakage or line overload condition and the print queue cannot be used, the scanner suspends the reading of the printing document (temporarily stops reading). In this case, since the requested processing is still going on, the key operation of the scanner is disabled to block any unintended operation by a third party.

If receiving a notification of a failure from the printer when the scanner 100 has completed reading a printing document, the system proceeds to normal print-out processing by the printer and performs a normal failure recovery operation at the printer.

In contrast, when a failure occurs in the scanner 100, a printer connected to the scanner is notified of the failure so that the printer performs predetermined processing. The scanner 100 displays particulars of the failure on the display screen to prompt the user to perform recovery from the failure.

Each of the printers A101, B102 and C103 receives a print request from the scanner 100, and stores requested print jobs in the print queue to form a queue to print them out sequentially. The print jobs stored in the print queue can be processed by handling several pages as one print job (multi-page job function), and the entire print jobs is deleted from the print queue once all the pages have been printed out.

Upon receiving information of an error which has occurred in the scanner 100 when reading a printing document, the printer disables the key operation of the printer's operation panel used for input operation or the like, and displays on the screen a message indicating that a failure has occurred in the scanner. It is also possible to notify the scanner 100 of a failure which has occurred in one of the printers A101, B102 and C10.

This configuration enables the scanner 100 and the printers A101, B102 and C10 to mutually communicate a failure which has occurred in any of them, and to perform optimal failure recovery processing according to the processing state of the scanner at the occurrence of the failure. For example, when a failure has occurred in the scanner 100 during read processing, the scanner 100 notifies the printer, which is communicating with the scanner, of the occurrence of the failure so that the key operation on the printer side is disabled. Thus, the printer can be blocked from operation by a third party, and the scanner 100 is allowed to recover from the failure while keeping the processing state before the occurrence of the failure.

Figure 2:
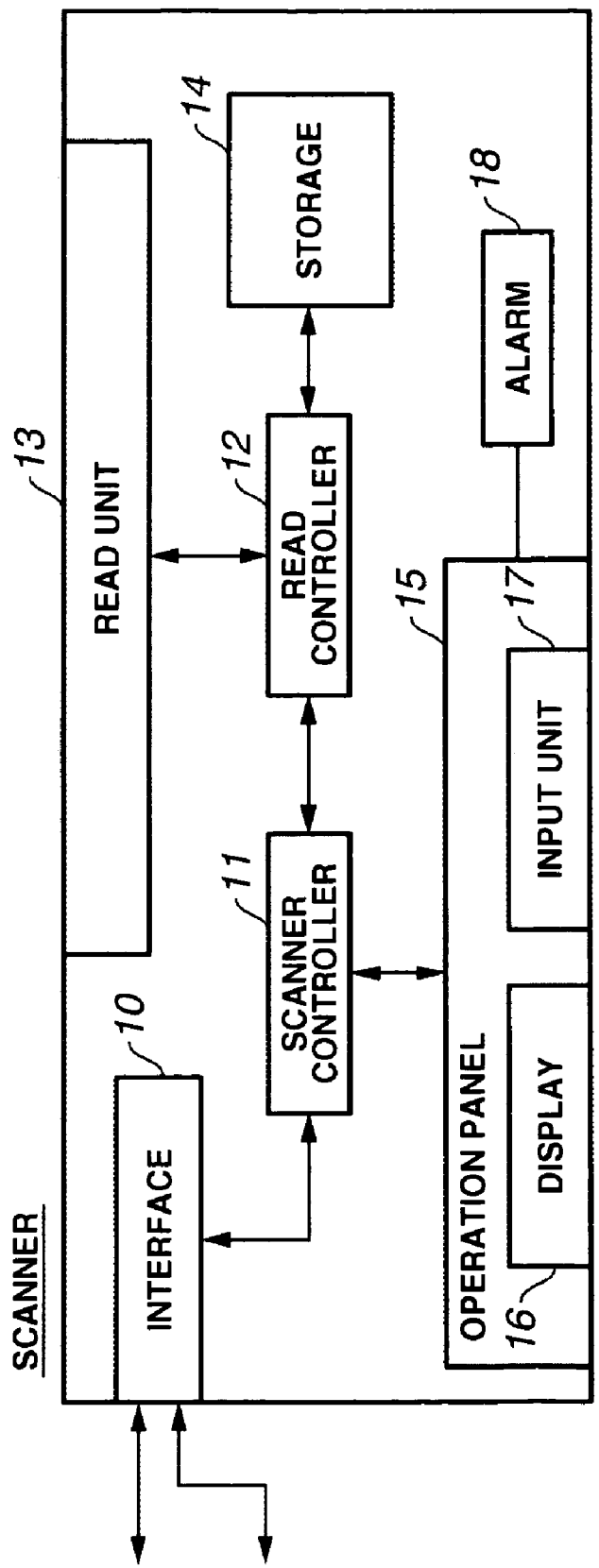
FIG. 2 is a block diagram illustrating a configuration of a scanner in the image forming system according to an embodiment of the present invention.

FIG. 2 is a block diagram illustrating detailed configuration of the scanner in the image forming system according to the present invention.

The scanner 100, as shown in FIG. 2, includes an interface 10, a scanner controller 11, a read controller 12, a read unit 13, a storage 14, an operation panel 15, a display 16, an input unit 17, and an alarm 18. The scanner 100 displays to the user a failure which has occurred in the scanner 100 or one of the printers connected to the scanner 100 to enable the user to take appropriate measure for recovering the system from the failure.

The interface 10 is a communication interface to communicate with the printers connected thereto. The interface 10 is able to provide network connection using an Ethernet (registered trademark) cable and P2P (Peer to Peer) connection (local connection) using a USB cable. The connection is not limited to wired connection, and the interface 10 may be connected by wireless connection using wireless LAN (Local Area Network) or the like.

The scanner controller 11 is a main control of the scanner, and issues a print request by transmitting image data of a printing document read by the read unit 13 to a selected printer. The scanner controller 11 also detects a failure which has occurred in the scanner 100, generates a failure occurrence notification signal indicating the occurrence of the failure and sends the signal to a printer which is in communication with the scanner 100. Upon receiving a failure occurrence notification signal indicating that a failure has occurred in one of the printers, the scanner controller 11 sends instructions according the read status to the read controller 12.

Firstly, when a failure occurrence notification signal indicating occurrence of a failure is received during reading from a printer to which a print request is provided via the interface 10, or when the image data cannot be transferred to the printer, the scanner controller 11 determines whether or not a print queue of the printer can be used. If the print queue can be used, the scanner controller 11 gives a read instruction to the read controller 12. Upon receiving the read instruction, the read controller 12 instructs the read unit 13 to continue reading. The image data thus read is stored in the storage 14 and is also sent from the read controller 12 to the scanner controller 11 to transfer the same to the printer as a print job.

If it is determined that the print queue cannot be used, the scanner controller 11 instructs the read controller 12 to stop reading. The read controller 12 thus controls the read unit 13 to temporarily stop reading the printing document. A message is displayed on the display 16 of the operation panel 15 to tell that operation by the operation keys is disabled due the failure in the printer, until a signal indicating recovery from the failure is received.

Secondly, when a failure has occurred in the scanner 100 during reading, the scanner controller 11 sends to the printer a failure occurrence notification signal indicating the occurrence of the failure, and at the same time sends to the read controller 12 to stop reading. The read controller 12 thus causes the read unit 13 to stop reading the printing document. A message is displayed on the scanner's screen indicating that a failure has occurred to prompt the user to perform failure recovery processing.

The determination whether or not the scanner 100 is in the process of reading a printing document is made based on whether or not a data transfer completion signal has been transmitted to the printer indicating that the transfer of image data has been completed. If the failure occurrence notification signal is received before the data transfer completion signal is transmitted, it is determined that the failure has occurred while the scanner is in the process of reading image data or completing the reading processing.

If the failure occurrence notification signal is received from the printer after the image data transfer completion signal has been transmitted, it is determined that the failure has occurred in the printer after the scanner completing the reading. In this case, no message is displayed on the scanner's screen since the scanner has completed the read processing.

The read controller 12 controls the read unit 13 to read a printing document. The read controller 12 generates image data of the printing document thus read, and stores the image data in the storage 14 while sequentially transferring the generated image data to the printer via the scanner controller 11. Further, the read controller 12 controls the read processing of the read unit 13 according to instructions from the scanner controller 11.

When the read controller 12 is requested to stop reading the printing document by the scanner controller 11 which has received a failure occurrence notification signal from the printer to which a print request is issued, for example, the read controller 12 controls the read unit 13 to temporarily stop the reading. When the failure in the printer is removed and the read controller 12 receives a failure recovery signal, the read controller 12 controls the read unit 13 to restart reading.

The read unit 13 is formed by a CCD (Charge-Coupled Device) or the like, and reads a printing document. Image data of the printing document read by the read unit 13 is controlled by the read controller 12.

The storage 14 stores programs and various parameters used in the controller 11 and the read controller 12. The storage 14 also stores the image data sent from the read controller 12.

The operation panel 15 is a user interface which is used by the user to give instructions to the scanner 100, and includes a display 16, and an input unit 17.

The display 16 displays a screen to prompt the user to enter data, and also displays a screen to give instructions to the user. These screens are for displaying the particulars of the control performed by the scanner controller 11, and display the same based on display instructions from the scanner controller 11.

When a failure has occurred in the scanner, for example, the display 16 displays to the user a screen which shows information on the failure condition and instructs necessary operation to recover from the failure to the user. When the scanner controller 11 receives a failure occurrence notification signal from the printer, the display 16 displays a screen indicating that read processing is stopped due to occurrence of the failure in the printer.

The input unit 17 is an operation key such as a button or a four-way scroll key, and functions a user interface which enables the user to give instructions to the scanner. The input unit 17 can be used to give instructions to remove the failure which has occurred in the scanner 100 or to change the settings. Further, the input unit 17 can be used to issue a print request by selecting a printer to print out the image data of a printing document read by the scanner and causing the scanner to start reading the printing document.

The display 16 and the input unit 17 may be combined to form a touch panel display.

The alarm 18 is a sound generator which generates alarm sound (also called buzz) upon occurrence of a failure in the scanner. When the scanner is communicating with a designated printer and a failure has occurred in that printer, the alarm 18 also generates alarm sound to notify the user of the occurrence of the failure.

The designated printer as used herein is a printer which meets the conditions as shown in FIG. 5. It is also possible to previously designate a remotely located printer, for example, among the printers connected on the network.

The flow of the processing performed by the configuration above will now be described.

When the user selects a printer to print out with the use of the input unit 17 of the operation panel 15, the read unit 13 starts reading a printing document. While the printing document being read, the read image data is sequentially transferred to the selected printer through the scanner controller 11. If a failure occurs in the scanner or the printer during this read processing, failure recovery processing is performed according to the communication state of the data.

If the failure occurs in the scanner while the scanner is in the process of reading the printing document, the read processing is stopped and a failure occurrence notification signal indicating that the failure has occurred in the scanner is transmitted to the printer while, at the same time, a message indicating the occurrence of the failure is displayed on the scanner's display. Upon receiving the failure occurrence notification signal from the scanner, the printer stops its printing processing, and disables the operation of the operation keys while displaying a message that the failure has occurred in the scanner on the printer's display.

If the scanner receives a failure occurrence notification signal from the printer while reading the printing document, or if the image data read by the scanner cannot be transferred, the scanner temporarily stops the reading processing, and determines whether or not a print job is able to be stored in the printer's print queue. If the print job is able be stored, the scanner restarts the read processing. If not able to be stored, the scanner stops the read processing. In this case, the scanner will restart the read processing only after the printer has been recovered from the failure.

In this manner, the user is allowed to know where the failure has occurred by referring to either the display of the scanner or the display of the printer. The chance that the printer is operated by a third party also can be eliminated.

Figure 3:
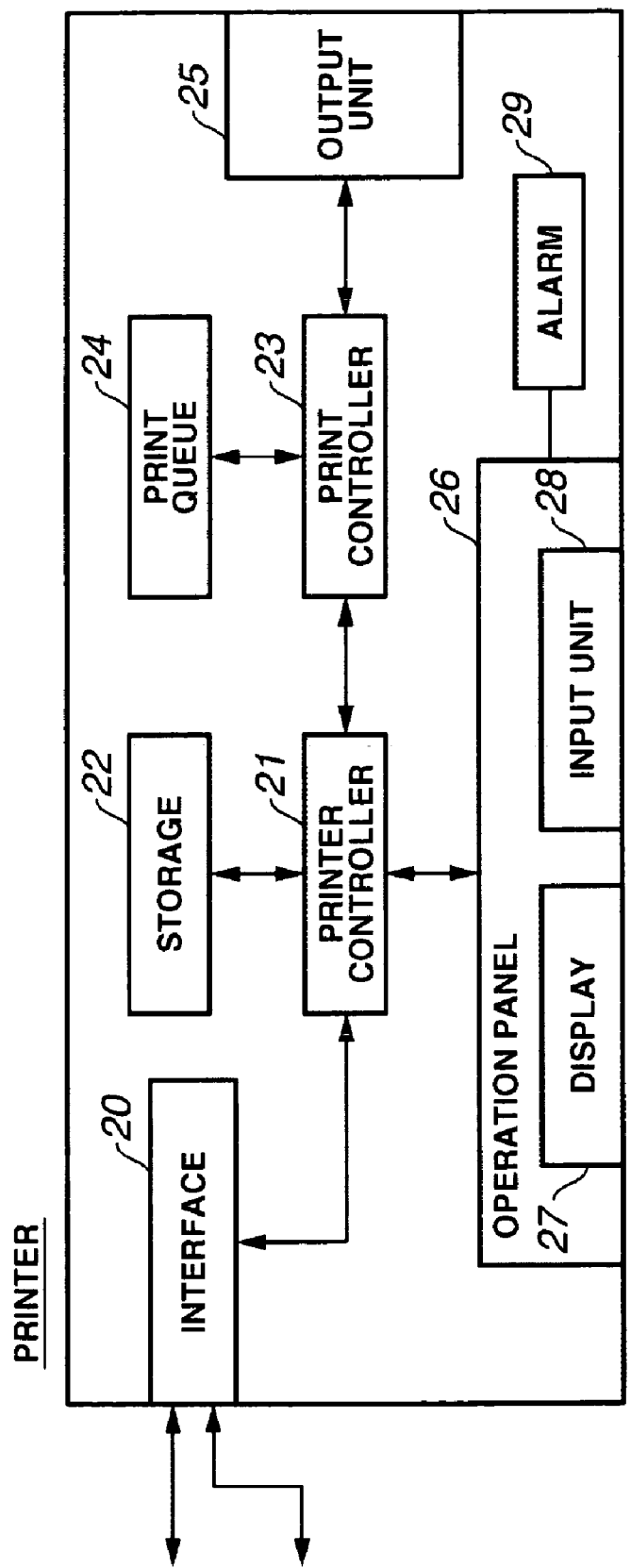
FIG. 3 is a block diagram illustrating a configuration of a printer in the image forming system according to the embodiment of the present invention.

FIG. 3 is a block diagram illustrating detailed configuration of the printer in the image forming system according to the present invention.

FIG. 3 shows the detailed configuration of the printer A101, B102 or C103 shown in FIG. 1. The printer includes an interface 20, a printer controller 21, a storage 22, a print controller 23, a print queue 24, an output unit 25, an operation panel 26, a display 27, and an input unit 28. The printer is arranged to enable recovery from a failure which has occurred in the printer or the scanner connected to the printer, by displaying the failure message to the user.

The interface 20 is a communication interface for communicating with the scanner 100 connected to the printer, and provides network connection using an Ethernet (registered trademark) cable as well as P2P (Peer to Peer) connection (local connection) using a USB cable. Like the interface of the scanner 100, this interface 20 also can be connected wireless.

The printer controller 21 is the main control of the printer, and controls a print job that is a print request received from the scanner 100. Upon receiving a failure occurrence notification signal from the scanner connected through the interface 20, the printer controller 21 disables the key operation by the user on the printer side, and displays on the display 27 a message that the printer operation is disabled due to the failure in the scanner. The printer controller 21 then notifies the print controller 23 of the receipt of the failure occurrence notification signal to cause the print controller 23 to execute the processing relating to print control. Upon the scanner recovering from the failure, the printer controller 21 enables the key operation of the printer that has been disabled.

The printer controller 21 is able to detect a failure which has occurred in the printer. The printer controller 21 transmits, at the same time as the occurrence of the failure, a failure occurrence notification signal to the scanner with which the printer communicating. In this case, a message is displayed on the display 27 that the failure has occurred in the printer itself. The processing is restarted by transmitting to the scanner a signal indicating that the printer has recovered from the failure as the result of input operation from the input unit 28 or failure recovery operation.

The printer controller 21 determines that the reception of the print job of the print request has been completed upon receiving a data transfer completion signal indicating the completion of the data transfer.

The storage 22 is formed by a ROM (Read Only Memory), a RAM (Random Access Memory) or the like, and stores programs executed by the printer controller 21 and various parameters.

The print controller 23 manages the print job in the print queue 24 according to instructions from the printer controller 21, and performs control so that the print jobs stored in the print queue 24 are sequentially printed out. If occurrence of a failure is detected by the printer controller 21, the print controller 23 stops the print out upon receiving instructions relating to the occurrence of the failure.

If the failure which has occurred in the printer is a failure relating to the print out operation such as paper jam or paper out, the print job can be stored in the print queue. Therefore, the print controller 23 accepts the print request. In contrast, if the failure relates to communication with the scanner, or is a failure of the print queue itself, or relates to operation of the printer controller 21 or the print controller 23, then the print job cannot be stored in the print queue. Therefore, the print controller 23 stops acceptance of the print request.

Upon receiving a failure occurrence notification signal from the scanner, the print controller 23 performs control so as to print out the print job stored in the print queue 24 or the pages of a print job formed by plural pages which have already been received. As for the print job formed by plural pages, the control is performed so as not to delete but to hold the job in the print queue 24 until all the pages of the job are received.

Figure 4:
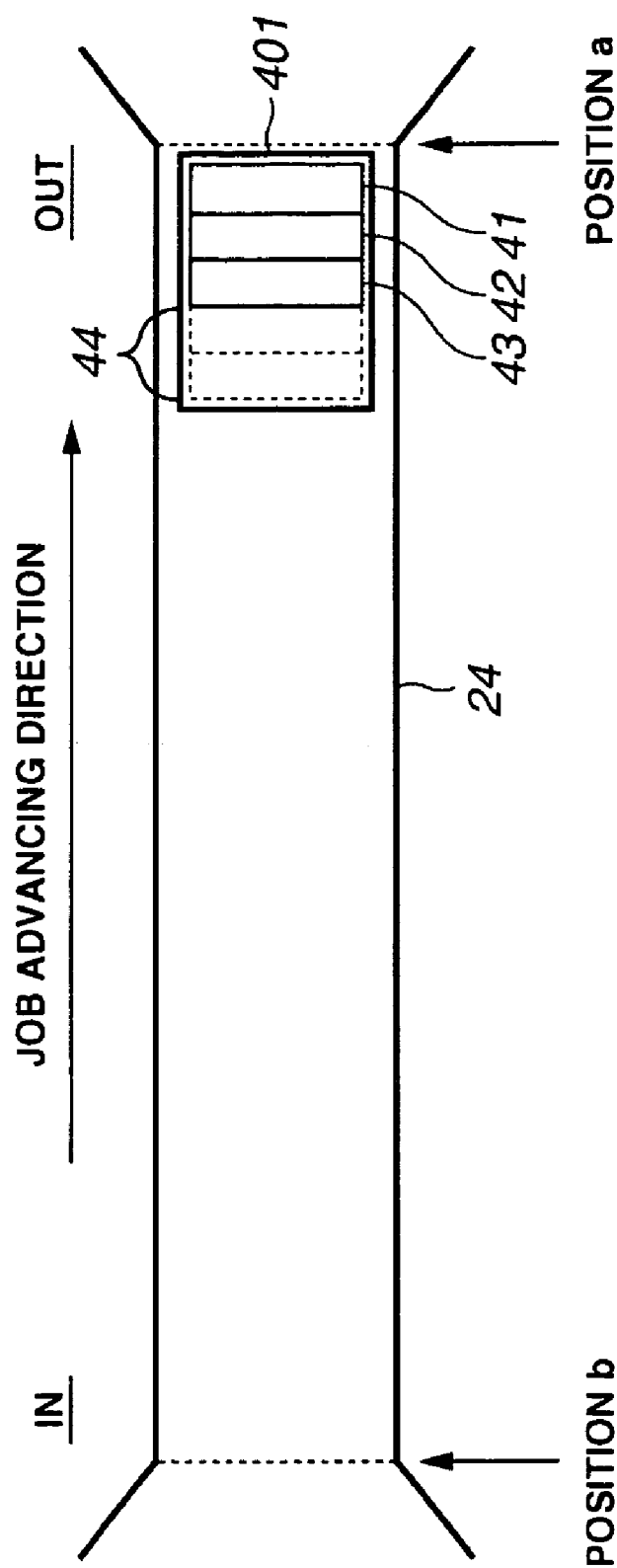
FIG. 4 illustrates a condition of a print queue of the printer in the image forming system according to the embodiment of the present invention.

The print queue 24 is an FIFO (First-In First-Out) type temporary storage area which is designed to store print jobs in the order of receiving them, and to output the print jobs in the order of storing them. The print job is deleted from the print queue 24 upon completion of the print-out thereof. The print queue 24 is capable of receiving a print job formed by plural pages, and pages of such print job are printed out sequentially upon and in the order of being received. All the pages of the print job are held until all the pages have been received and printed out. FIG. 4 shows an example of this operation.

The print queue 24 is cleared by powering the printer off or resetting the printer.

The output unit 25 is an engine to print out the print job transmitted from the print controller 23. If a failure such as paper jam or paper out occurs in this engine, the print controller 23 will detect it and notifies the printer controller 21 of the failure.

The operation panel 26 is a user interface for the user to give instructions to the printer, and includes a display 27, and an input unit 28.

The display 27 displays a screen to prompt the user to enter data, and also displays a screen to give instructions to the user. These screens display particulars of the control performed by the printer controller 21, based on the display instructions from the printer controller 21.

The input unit 28 is formed by an operation key such as a button or a four-way scroll key, and is a user interface enabling the user to give instructions to the printer. The printer input unit 28 is used to give instructions to eliminate the failure in the printer or to change the settings.

The alarm 29 generates alarm sound when a failure has occurred in the printer. The alarm sound is also generated, when a failure occurs in a designated scanner during communication with the scanner, to notify the user of that fact.

The designated scanner as used herein refers to a scanner which meets the conditions as shown in FIG. 5. It is also possible to previously designate a remotely located scanner, for example, from among the scanners connected on the network.

The configuration as described above makes it possible to control the read processing of the scanner according to the condition of the failure which has occurred in the printer, and further to disable the key operation of the printer in response to occurrence of a failure in the scanner during reading of a printing document.

This enables the scanner and the printer to be interlinked for recovery from the failure, and also enables elimination of the chance that unintended operation is performed by a third party.

FIG. 4 illustrates a condition of the print queue of the printer in the image forming system according to the present invention.

FIG. 4 shows the contents of the print queue 24 shown in FIG. 3, which stores a print job A401. The print job A401 is a multi-page print job consisting of five pages.

Page data (41, 42 and 43) corresponding to the leading three pages of the five pages is stored in the print queue 24, while page data (44) corresponding to the remaining two pages has not been received due to the failure.

If print-out is possible under this condition, the printer prints out the page data of the three leading pages (41, 42 and 43), and then halts until receiving the page data of the remaining two pages (44). Upon receiving all the page data and completing the print-out thereof, the print job is deleted from the print queue 24.

If the print queue in the halt condition receives a print job from a third host apparatus (a scanner or PC), priority control or the like is performed to place the received print job at the top of the print queue and to print out the same.

This makes it possible to use the printer without being dominated by one print job.

FIG. 5 is a matrix diagram illustrating particulars of operation of the scanner and the printer when a failure occurs.

FIG. 5 includes the items of connection state 501 showing connection environments between the scanner and the printer communicating with each other, failure occurrence location 502 showing a location where a failure has occurred, scanner processing state 503 showing the state of the scanner at the time when the failure has occurred, panel operation state 504 showing whether the panel operation is valid or invalid when the failure has occurred, and alarm sounding state 505 showing whether the alarm sound generation is on or off when the failure occurs.

For example, as seen from FIG. 5, when the connection state 501 is "LOCAL CONNECTION", the failure occurrence location 502 is "PRINTER", and the scanner processing state 503 is "SCANNING", the panel operation state 504 is "VALID" for the scanner and "INVALID" for the printer. Further, the alarm sounding state 505 is "ON" for the printer and "OFF" for the scanner.

When the panel operation state 504 is "VALID", it indicates that the operation panel is active for operation even when a failure occurs. Whereas when the panel operation state 504 is "INVALID", it indicates that the panel operation is disabled unless the failure is resolved by the apparatus whose panel operation is indicated as "VALID".

When the alarm sounding state 505 is "ON", it indicates that alarm sound is produced, whereas when "OFF", it indicates no alarm sound is produced.

Further, when the alarm sounding state 505 is "ON (low)", it indicates that alarm sound is generated at a lower sound level than a normal sound level.

It is also possible to previously designate a printer to generate alarm sound.

Figure 6:
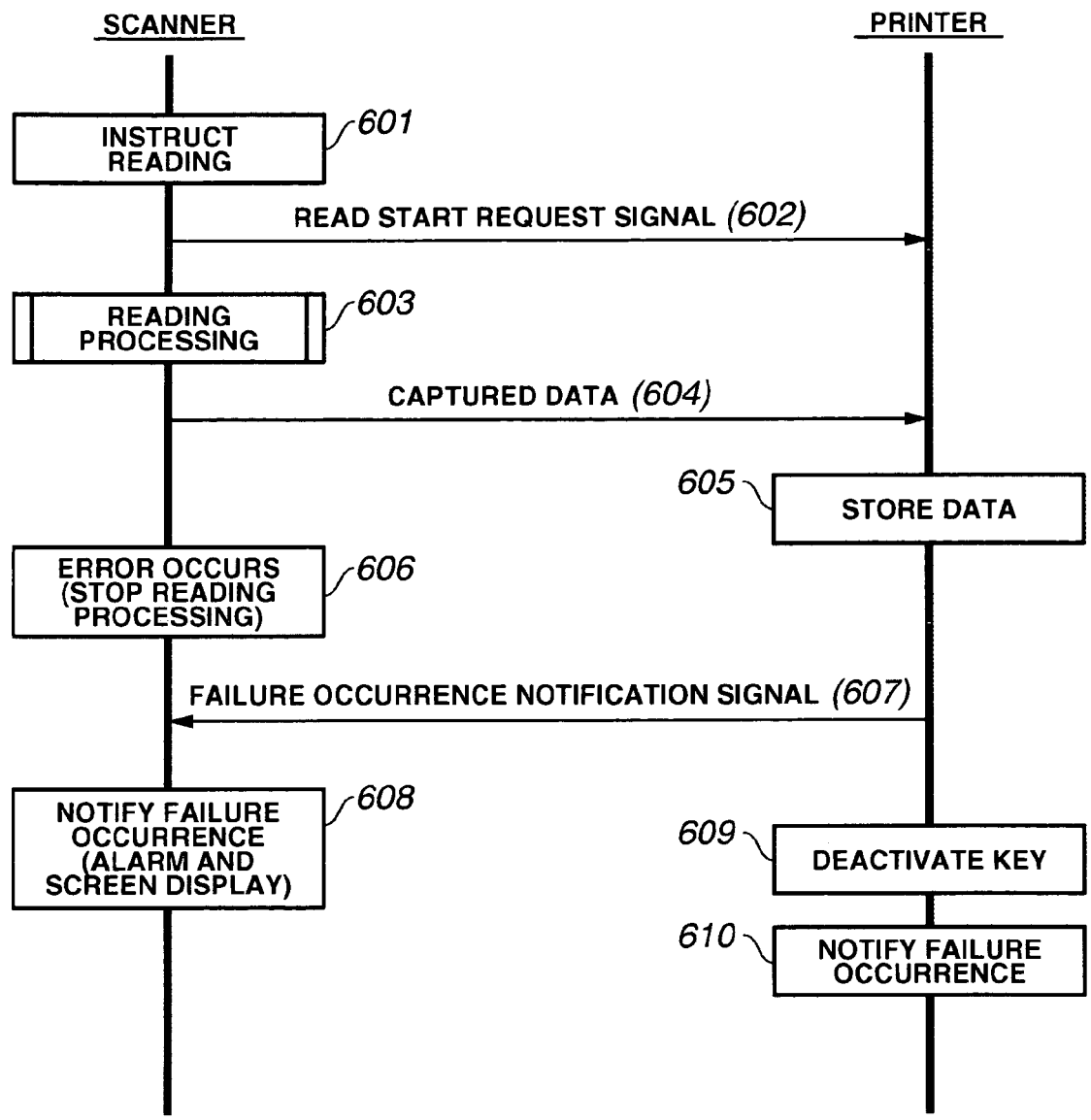
FIG. 6 is a sequence diagram illustrating processing to be performed when a failure occurs in the scanner during reading of a printing document.

FIG. 6 is a sequence diagram illustrating processing which is performed when a failure occurs in the scanner while reading a printing document.

As shown in FIG. 6, the processing starts upon the user selecting a printer to print out, and the scanner receives print instructions from the user (601). A read start request signal indicating the start of reading is transmitted to the selected printer (602). Upon receiving the signal, the printer recognizes that communication with the scanner is started. The scanner performs read processing on the printing document (603). Image data thus captured is transferred to the printer page by page (604), and the data is stored in the print queue (605). These processing steps from the read processing (603) to the data storage in the print queue are repeated until the entire printing document has been read.

If a failure occurs in the scanner during the read processing of the scanner, the read processing is immediately stopped (606), and a failure occurrence notification signal is transmitted from the scanner to the printer (607). If the printer receives the failure occurrence notification signal before receiving a data transfer completion signal (job end signal) indicating completion of a job, a message indicating the occurrence of the failure is displayed on the scanner's display screen, and alarm sound is produced (608).

Upon receiving the failure occurrence notification signal, the scanner disables the key operation of the printer's operation panel (609) to eliminate the chance that unintended operation is done in the printer by a third party. A message indicating that the failure has occurred in the scanner is also displayed on the printer's display screen (610) and, at the same time, alarm sound is generated at a low level only when the scanner and the printer are network connected.

Figure 7:
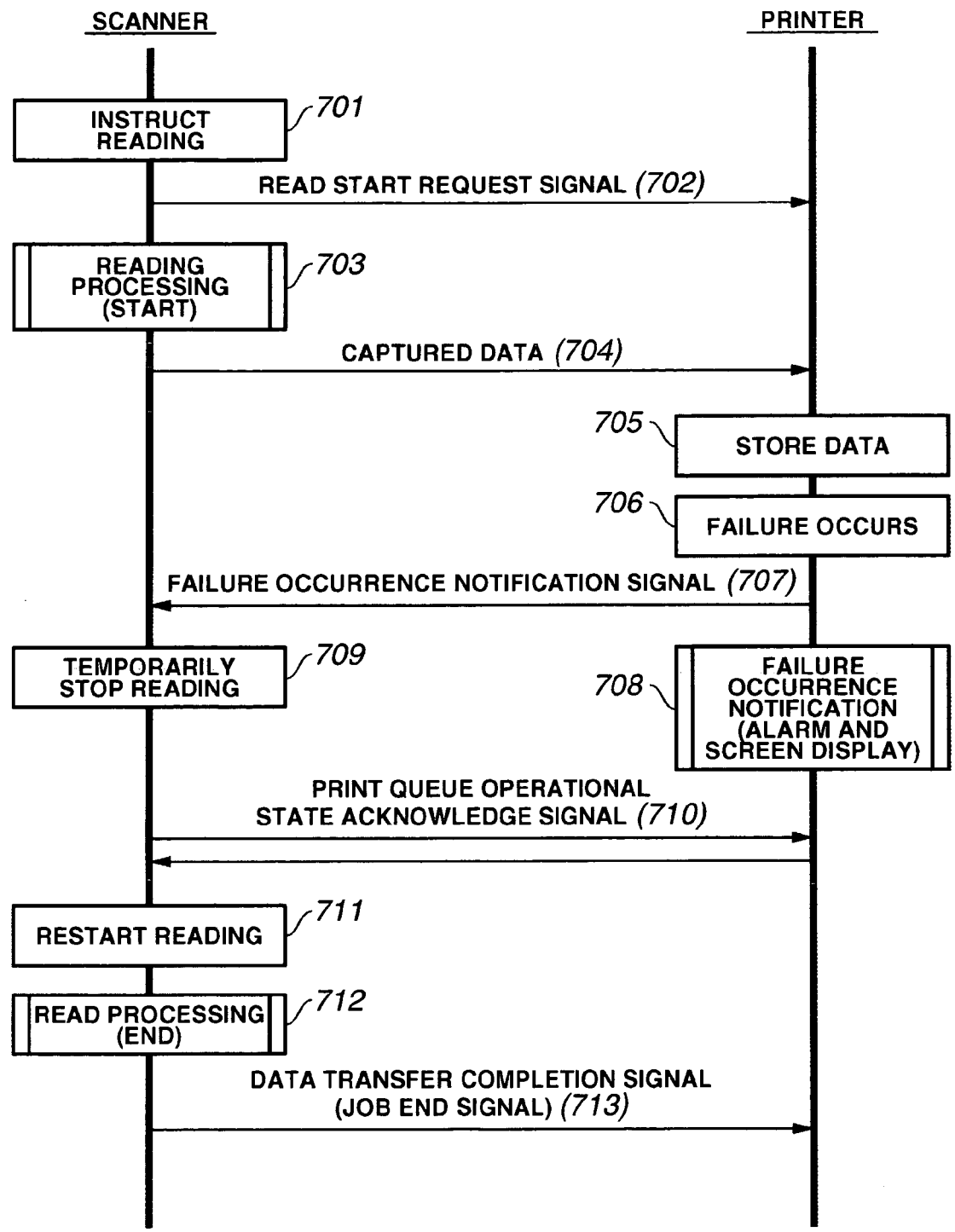
FIG. 7 is a sequence diagram illustrating processing to be performed when a failure occurs in the printer during reading of a printing document.

FIG. 7 is a sequence diagram illustrating processing which is performed when a failure occurs in the printer while the scanner is in the process of reading a printing document.

As shown in FIG. 7, the processing starts upon the user selecting a printer to print out, and the scanner receives print instructions from the user (701). A read start request signal indicating the start of reading is transmitted to the selected printer (702). Upon receiving the signal, the printer recognizes that communication with the scanner is started. The scanner performs read processing on the printing document (703). Image data thus captured is transferred to the printer page by page (704), and the data is stored in the print queue (705). These processing steps from the read processing (703)

to the data storage in the print queue are repeated until the entire printing document has been read.

If a failure occurs in the printer (706) after the scanner has completed the read processing (703) and while the printer is receiving the captured data from the scanner, it is detected whether a failure occurrence notification signal printer indicating the occurrence of the failure is provided to the scanner, or the data transmission from the scanner to the printer is disabled (707). A message indicating the occurrence of an error is displayed on the printer's display screen, and if the scanner and the printer are network connected, the scanner generates alarm sound at a low level (708).

Upon receiving the failure occurrence notification signal indicating the occurrence of the failure, the scanner temporarily stops reading (709), and transmits an operational state acknowledge signal to check the operational state of the print queue of the printer (710). If it is ascertained that the print queue is active, the scanner restarts the reading which has been stopped temporarily (711).

When the scanner completes reading the printing document (712), a data transfer completion signal (job end signal) is sent to the printer (713).

Figure 8:
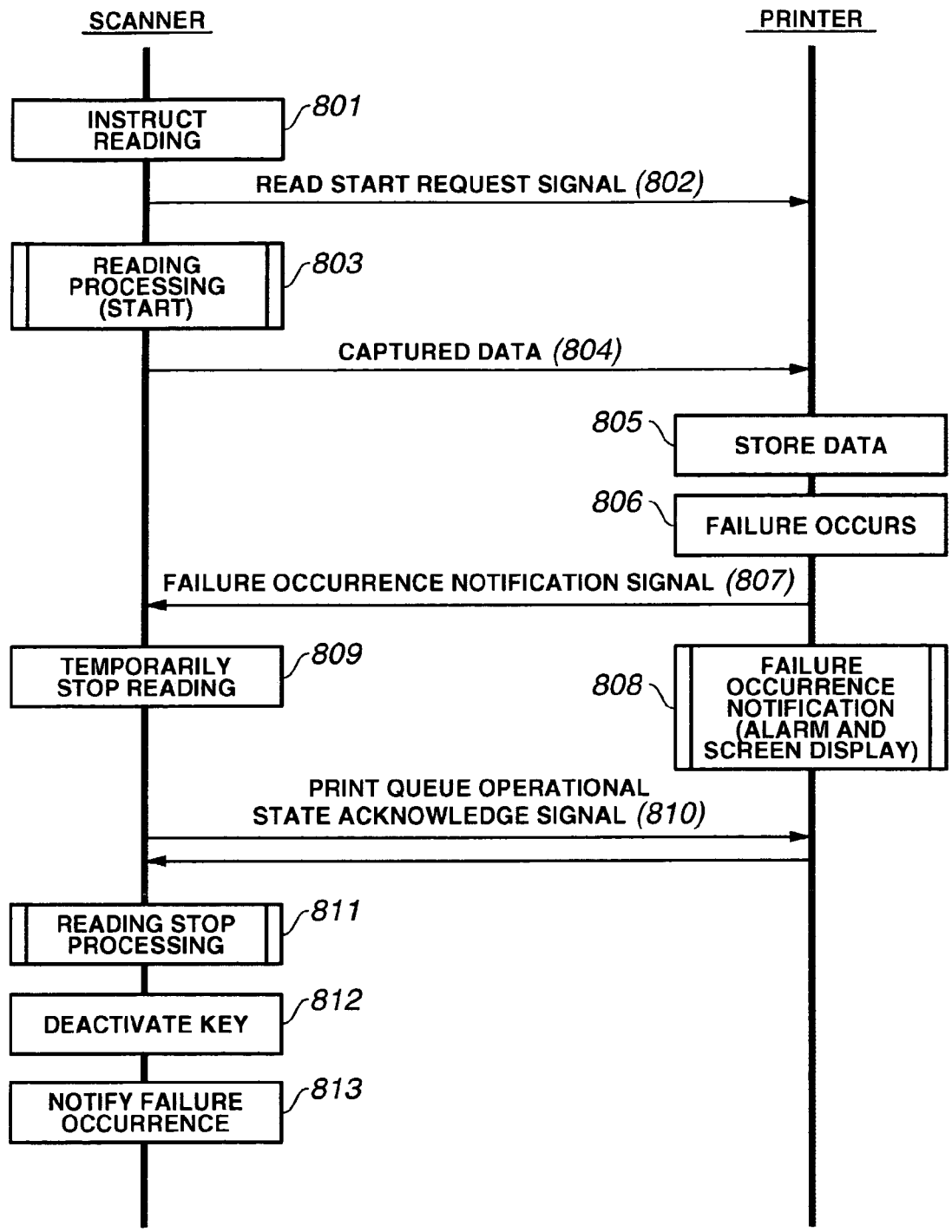
FIG. 8 is a sequence diagram illustrating processing to be performed when a failure occurs in the printer in other condition while the scanner is in the process of reading a printing document.

FIG. 8 is a sequence diagram illustrating processing which is performed when a failure occurs in the printer in other condition while the scanner is in the process of reading a printing document.

As shown in FIG. 8, the processing starts upon the user selecting a printer to print out, and the scanner receives print instructions from the user (801). A read start request signal indicating the start of reading is transmitted to the selected printer (802).

Upon receiving the signal, the printer recognizes that communication with the scanner is started. The scanner performs read processing on the printing document (803). Image data thus captured is transferred to the printer page by page (804), and the data is stored in the print queue (805). These processing steps from the read processing (803) to the data storage in the print queue are repeated until the entire printing document has been read.

If a failure occurs (806) which disables the use of the print queue after the scanner has completed the read processing (803) and while the printer is still receiving the read data from the scanner, a read stop request signal is transmitted to the scanner (807). At the same time, the printer displays on its screen a message indicating that the failure has occurred in the printer, and also generates alarm sound if the scanner and the printer are network connected (808).

Upon receiving the failure occurrence notification signal indicating the occurrence of the failure, the scanner temporarily stops reading (809), and transmits an operational state acknowledge signal to check the operational state of the print queue of the printer (810). If it is ascertained that the print queue is not active, the scanner completely stops the reading which has been stopped temporarily (811).

The scanner then disables the key operation of the scanner (812), and notifies the user that the failure has occurred in the printer (813).

The processing described above enables the system to recover from a failure according to the condition in which the failure has occurred.

It should be understood that the present invention is not limited to the specific embodiments as described above and shown in the attached drawings, and changes and variations may be made without departing from the spirit or scope of the invention.

The present invention is applicable to processing for recovery from a failure in an environment where a scanner and a printer are connected, and is especially useful for performing processing for recovery from a failure which occurs during reading of a printing document, while blocking unintended operation by a third party.

As described above, according to an aspect of the present invention, an image forming system comprises an image reading apparatus; a printer that is connected to the image reading apparatus and performs printing processing by directly receiving image data read by the image reading apparatus; and a notification unit that notifies failure information to the other apparatus if a failure occurs either in the image reading apparatus or in the printer, wherein the image reading apparatus comprises a failure information acquisition unit that acquires failure information notified by the notification unit when a failure has occurred in the printer; a determination unit that determines whether or not the image reading apparatus is in the process of reading image data; and an announcing unit that announces the failure information acquired by the failure information acquisition unit, if the determination unit determines that the image reading apparatus is not in the process of reading image data, wherein the printer comprises an announcement prohibiting unit that prohibits announcement of the failure information notified by the notification unit, if the failure has occurred in the image reading apparatus.

According to another aspect of the present invention, in the image forming system according to the first-mentioned aspect of the present invention, the announcing unit announces information on the failure in the printer by generating alarm sound by means of an alarm provided in the image reading apparatus.

According to still another aspect of the present invention, in the image forming system according to the another aspect of the present invention, the announcing unit announces information on the failure in the printer by displaying the information on a display provided in the image reading apparatus.

According to yet another aspect of the present invention, in the image forming system according to the first-mentioned aspect of the present invention, the announcement prohibiting unit prohibits the alarm from generating alarm sound, the alarm being provided in the printer for announcing information on the failure in the image reading apparatus.

According to even another aspect of the present invention, in the image forming system according to the another aspect of the present invention, the announcement prohibiting unit prohibits the information on the failure in the image reading apparatus from being displayed on the display provided in the printer.

According to further aspect of the present invention, in the image forming system according to the first-mentioned aspect of the present invention, the image reading apparatus further comprises a temporary read stop unit that, when the determination unit determines that the image reading apparatus is in the process of reading image data, temporarily stops the reading upon being notified of the failure information of the printer by the notification unit.

According to still further aspect of the present invention, in the image forming system according to the further aspect of the present invention, the image reading apparatus comprises an ascertaining unit that, when the reading operation is temporarily stopped by the temporary read stop unit, ascertains whether the printer that has notified the failure information is able to accept image data; and the image reading apparatus cancels the temporary stop by the temporary read stop unit and restarts the reading, if the ascertaining unit ascertains that the printer is able to accept image data.

According to even further aspect of the present invention, in a communication control method in an image forming system having an image reading apparatus, a printer that is connected to the image reading apparatus and performs printing processing by directly receiving image data read by the image reading apparatus, and notification unit that notifies, failure information to the other apparatus if a failure occurs in either the image reading apparatus or the printer, the image reading apparatus comprising a failure information acquisition unit, a determination unit, and an announcing unit, the communication control method comprises acquiring failure information notified by the notification unit when a failure occurs in the printer, by means of the failure information acquisition unit; determining whether the image reading apparatus is in the process of reading image data, by means of the determination unit; announcing the failure information acquired by the failure information acquisition unit, by means of the announcing unit, if the determination unit determines that the image reading apparatus is not in the process of reading image data; and prohibiting, in the printer, communication control method the announcement of the failure information notified by the notification unit if the failure occurs in the image reading apparatus.

The forgoing description of the embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-81693 filed on Mar. 22, 2005 including specification, claims, drawings and abstract is incorporated herein by reference in its entirety.

What is claimed is:

1. An image forming system comprising:
   an image reading apparatus;
   a printer that is connected to the image reading apparatus and performs printing processing by directly receiving from the image reading apparatus image data read by the image reading apparatus; and
   a notification unit that notifies failure information to the other apparatus if a failure occurs either in the image reading apparatus or in the printer, wherein
   the image reading apparatus comprises:
      a scanner controller that acquires the failure information notified by the notification unit when the failure occurs in the printer, announces the failure information by generating alarm sound by means of an alarm provided in the image reading apparatus, determines from the failure information whether or not the printer is able to accept the image data, and disables input operation of an operation unit provided in the image reading apparatus when determining that the printer is not able to accept the image data; and
      a read controller that temporarily stops reading of the image data if the scanner controller acquires the failure information while reading the image data, and stops the reading which is temporarily stopped if the scanner controller determines that the printer is not able to accept the image data, and
   the printer comprises:
      a printer controller that, if the failure occurs in the printer, makes the failure information displayed on a display provided in the printer and notifies the failure information to the image reading apparatus by the notification unit.

2. The image forming system according to claim 1, wherein the read controller restarts reading of the image data when the scanner controller ascertains that the printer is able to accept the image data during the temporary stop of reading of the image data.

3. The image forming system according to claim 1,
   wherein the scanner controller, when the failure occurs in the image reading apparatus, makes the failure information displayed on a display provided in the image reading apparatus, and notifies the failure information to the read controller and the printer,
   the read controller, when the failure information is notified while reading the image data, stops reading the image data, and
   the printer controller, when the failure occurs in the image reading apparatus, acquires the failure information notified by the notification unit, makes the acquired failure information displayed on the display provided in the printer, and disables input operation of an operation unit provided in the printer.

4. The image forming system according to claim 3, wherein the printer controller announces information on the failure in the image reading apparatus by generating alarm sound by means of an alarm provided in the printer when acquiring the failure information notified by the notification unit.

5. A communication control method in an image forming system that includes an image reading apparatus having a scanner controller and a read controller, a printer that is connected to the image reading apparatus and performs printing processing by directly receiving from the image reading apparatus image data read by the image reading apparatus, the printer having a printer controller, and a notification unit that notifies failure information to the other apparatus if a failure occurs in either the image reading apparatus or the printer, the communication control method comprising:
   steps, which are performed by the scanner controller in the image reading apparatus when a failure occurs in the printer, of:
      acquiring the failure information notified by the notification unit, announcing the failure information by generating alarm sound by means of an alarm provided in the image reading apparatus, determining from the failure information whether or not the printer is able to accept the image data and disabling input operation of an operation unit provided in the image reading apparatus when ascertaining that the printer is not able to accept the image data,
   the steps, which are performed by the read controller in the image reading apparatus, of: temporarily stopping reading of the image data if the failure information is acquired by the scanner controller while reading the image data, and stopping the reading which is temporarily stopped if it is determined by the scanner controller that the printer is not able to accept the image data; and
   steps, which are performed by the printer controller in the printer when a failure occurs in the printer, of:
      displaying the failure information on a display provided in the printer, and notifying the failure information to the image reading apparatus by the notification unit.

* * * * *